United States Patent
Boggs (10) Patent No.: US 8,453,696 B2
(45) Date of Patent: Jun. 4, 2013

(54) AUTOMATED EDGE WRAPPING OF A PANEL

(75) Inventor: Michael J. Boggs, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 13/189,890

(22) Filed: Jul. 25, 2011

(65) Prior Publication Data

US 2013/0025773 A1    Jan. 31, 2013

(51) Int. Cl.
*B32B 37/02* (2006.01)

(52) U.S. Cl.
USPC ........... 156/479; 156/202; 156/216; 156/227; 156/443

(58) Field of Classification Search
USPC ................ 156/196, 199, 200, 201, 202, 204, 156/212, 213, 216, 227, 443, 476, 477.1, 156/479, 480
See application file for complete search history.

(56) References Cited

U.S. PATENT DOCUMENTS

| | | | |
|---|---|---|---|
| 2,970,634 A * | 2/1961 | Hantscho | 156/202 |
| 3,389,645 A | 6/1968 | Winters et al. | |
| 3,616,077 A | 10/1971 | Jesse | |
| 4,248,657 A | 2/1981 | Henry | |
| 4,571,916 A | 2/1986 | Meuwly et al. | |
| 5,246,516 A * | 9/1993 | Rias | 156/202 |
| 5,565,222 A * | 10/1996 | Scherer | 156/202 |
| 6,544,366 B2 | 4/2003 | Hamilton et al. | |
| 7,303,641 B2 | 12/2007 | Swiszcz et al. | |
| 7,789,986 B2 | 9/2010 | Brown et al. | |
| 7,951,252 B2 | 5/2011 | Danko | |
| 2008/0087768 A1 | 4/2008 | Lloyd | |

OTHER PUBLICATIONS

Edge Bander Machine MF509 published at http://www.alibaba.com/product-gs/338015920/edge_bander_machine_MF509/showimage.html, Jun. 13, 2011.

* cited by examiner

*Primary Examiner* — Katarzyna Wyrozebski Lee
*Assistant Examiner* — John Blades
(74) *Attorney, Agent, or Firm* — Ostranger Chong Flaherty & Broitman P.C.

(57) ABSTRACT

A self-contained, portable and automated apparatus and method for wrapping edges of a panel with a protective and/or decorative laminate material comprises conveying means for moving the panel from an entry end of the apparatus to an exit end of the apparatus, lifting means for transversely deflecting the flap upward to a position substantially perpendicular to the front surface of the panel as the panel is conveyed, adhesive application means for applying an adhesive to a back surface of the panel proximate the edge substantially throughout the length of the panel as the panel is moved past the adhesive application means, a folding bar positioned downstream from the adhesive application means at an angle of about 135 to 170 degrees relative to a trailing part of the edge to transversely deflect the flap downward toward the adhesive on the back surface of the panel, and a roller positioned downstream from the folding bar and arranged to spin inwardly over the flap at an angle of about 130 to 150 degrees relative to the trailing part of the edge to cause the flap to stretch inwardly and be secured to the back surface of the panel.

20 Claims, 6 Drawing Sheets

AUTOMATED EDGE WRAPPING OF A PANEL

TECHNICAL FIELD

The embodiments disclosed hereinafter generally relate to a self-contained, portable and automated apparatus and method for wrapping edges of a panel with a protective and/or decorative laminate material.

BACKGROUND

It is desirable for structural and other panels used in aerospace and other applications to be lightweight and provided with a protective and/or decorative laminate coating on their exterior surfaces to provide desired aesthetic, acoustic or other properties. For example, and without limitation, overhead stowage bins are generally composed of fiberglass panels that are provided with an appropriate shape and covered with a protective and/or decorative laminate, such covered panels then being assembled to form the bins. Each panel that makes up a particular structure may be separately fabricated with a laminate covering secured to the panel such that the laminate defines the exterior surface of the fabricated panel. While panel constructions of this type are known to be used in a wide variety of applications, including aerospace applications, the construction of such covered panels, and specifically the application of a laminate cover to the panel has long been an undesirably inefficient, and costly, requiring a high degree of manual labor to ensure that the laminate is properly attached to the panel and avoids undesired looseness, puckering, wrinkling or de-lamination.

Covered panels are typically fabricated by applying a laminate material across a front surface of the panel, such that the laminate material has flaps extending beyond the side edges of the panel, manually wrapping the flaps around the side edges of the panel, and adhesively securing the flaps to a back surface of the panel. The laminate material may be adhered directly to the front surface of the panel and then stretched and wrapped around the side edges of the panel for adhesive securement to the back surface of the panel. For example, contact cement may be used to adhere the laminate material to the front surface of the panel, which requires time for the contact cement to dry. The flaps are then heated and stretched by hand to wrap the flaps around the side edges, and hot-melt glue is manually applied to adhere the flap to the back surface of the panel. This has been a time consuming and therefore costly manual process, each panel taking approximately 15 minutes to fabricate, depending on the panel's size, with substantial manual manipulation of the panel during the process. Manual fabrication of such panels may also result in injuries to the fabricators, including burning and cutting their fingers and repetitive stress injuries, such as carpel tunnel syndrome.

Automated machines and processes for manufacturing covered panels and articles, including the wrapping of the panel's edges, are known. However, each has a problem in utilization that makes it relatively unattractive to use or requires a complex combination of parts in large factory machinery. There is therefore a need for a simplified, self-contained and portable apparatus and method for automated edge wrapping for a covered panel that improves cost- and time-efficiency as well as safety.

SUMMARY

The foregoing purposes, as well as others that will be apparent, are achieved generally by providing a simplified, self-contained and portable apparatus for wrapping an edge of a panel with a laminate cover positioned on a front surface of the panel such that the laminate cover has a flap extending past the edge of the panel. In one embodiment, the apparatus comprises conveying means for moving the panel from an entry end of the apparatus to an exit end of the apparatus, lifting means for transversely deflecting the flap upward to a position substantially perpendicular to the front surface of the panel as the panel is conveyed, adhesive application means for applying an adhesive to a back surface of the panel proximate the edge substantially throughout the length of the panel as the panel is moved past the adhesive application means, a folding bar positioned downstream from the adhesive application means at an angle of about 135 to 170 degrees relative to a trailing part of the edge to transversely deflect the flap downward toward the adhesive on the back surface of the panel, and a roller positioned downstream from the folding bar and arranged to spin inwardly over the flap at an angle of about 130 to 150 degrees relative to the trailing part of the edge to cause the flap to stretch inwardly and be secured to the back surface of the panel.

A method is also provided for wrapping an edge of a panel with a laminate cover positioned on a front surface of the panel such that the laminate cover has a flap extending past the edge of the panel. In one embodiment of the method, the panel is positioned at an entry end of an edge wrapping apparatus having a conveying system for effecting generally linear movement of the panel lengthwise through the edge wrapping apparatus. The flap is transversely deflected upward to a position substantially perpendicular to the front surface of the panel as the panel is moved through the edge wrapping apparatus. An adhesive is applied to a back surface of the panel proximate the edge substantially throughout the length of the panel as the panel is moved through the edge wrapping apparatus. The panel is moved past a folding bar positioned at an angle of about 135 to 170 degrees relative to the trailing part of the edge to transversely deflect the flap downward toward the adhesive on the back surface of the panel, and then through a roller positioned to spin inwardly over the flap at an angle of about 130 to 150 degrees relative to the trailing part of the edge to cause the flap to stretch inwardly and be secured to the back surface of the panel.

Other objects, features and advantages of the present invention will be apparent when the detailed description of the preferred embodiments is considered in conjunction with the drawings.

DETAILED DESCRIPTION

Reference will hereinafter be made to the drawings in which similar elements in different drawings bear the same reference numerals.

In the following description, a typical construction of edge-wrapped panels for use in the aerospace industry, as well as other industries, is briefly described for background purposes, but it will be appreciated that variations in the shape, size, composition and construction of such panels can be adapted depending on their intended use while still permitting their edge wrapping in accordance with the teachings of this disclosure.

Figure 1:
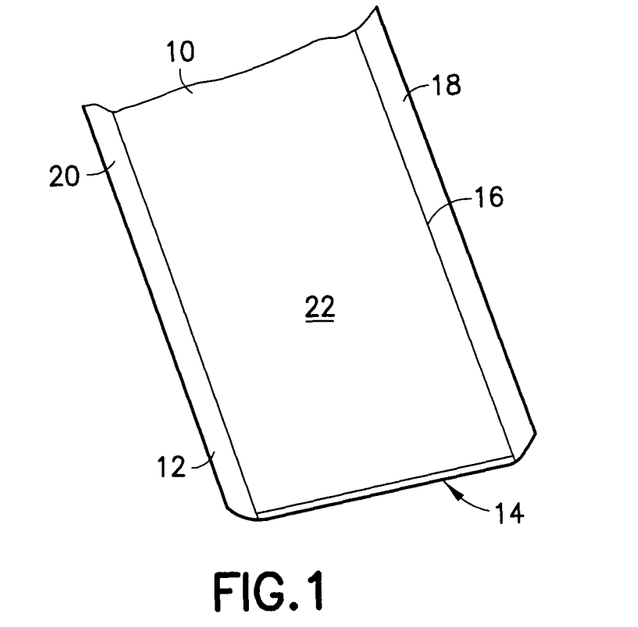
FIG. 1 is a perspective view of a panel with a laminate cover prior to edge wrapping.
Figure 2:
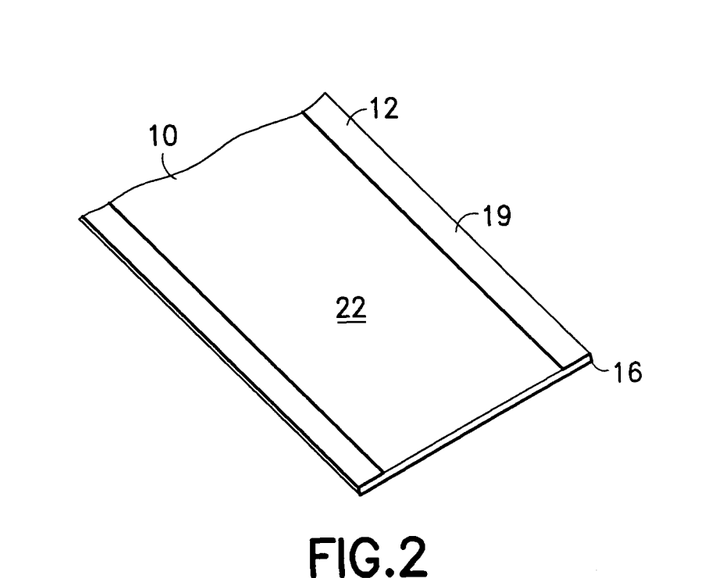
FIG. 2 is a perspective view of a panel with a laminate cover after edge wrapping.

Referring to FIGS. 1 and 2, respectively, a rectangular shaped panel is illustrated before and after edge wrapping. The panel 10 is composed of a lightweight material that is generally stiff or rigid, such as fiberglass, aluminum or plastic, but any other generally stiff or rigid material may be wrapped in accordance with the apparatus and method disclosed herein. The panel has a flat, sheet-like configuration defined by large front 14 and back 22 surfaces, and a thickness that is small in comparison to its length and width dimensions. The size and shape of the panel is dependent on the desired end use. Wrapped panels useful in aerospace applications typically have at least one straight edge and a length of 48, 60 or 90 inches. However, there is no limit as to the size of panels that may be wrapped in accordance with the disclosure herein.

The panel 10 has a flexible laminate cover 12 completely covering one surface of the panel, referred to herein as the front surface 14 of the panel, and extending past at least one side edge 16 of the panel to form a flap 18 that protrudes outwardly from the side edge 16. In the embodiment shown in FIG. 1, the laminate cover is large enough to form two flaps 18, 20. Additional embodiments may include a cover that forms flaps extending outwardly from each of the panel's side edges. The flaps typically extend about ½ inch past the panel's side edges. The laminate cover may be any lightweight, thin and flexible material that provides the desired aesthetic, acoustic or other properties to the front surface 14 of the panel. For example, and without limitation, the laminate cover may be made from vinyl, plastic, textile or nonwoven materials. The laminate cover is preferably thin like paper, approximately 10 to 20 thousandths of an inch, but can be thicker as long as the laminate cover remains soft and pliable without the application of heat. Each of the flaps 18, 20 of the laminate cover is intended to be wrapped around the side edges 16 of the panel such that the laminate cover completely covers the front surface 14, forms a wrapped edge around the side edges 16 and is adhesively engaged with the back surface 22 of the panel, as illustrated in FIG. 2. When so wrapped, the panel may be used to form a variety of parts and assemblies for use in aerospace and other applications.

Referring to FIGS. 3-7, a self-contained and portable edge wrapping apparatus 24 is shown that automatically wraps a flap 18 around the side edge 16 of a panel 10, stretches the flap 18, and adhesively secures the flap 18 to the back surface 22 of the panel 10 as the panel is moved lengthwise through the apparatus. For this purpose, the edge wrapping apparatus 24 comprises a conveying means for moving the panel 10 from an entry end 26 (FIG. 4) of the apparatus to an exit end 28 (FIG. 5) of the apparatus, lifting means for transversely deflecting the flap upward to a position substantially perpendicular to the front surface 14 of the panel 10 as the panel is conveyed through the apparatus, adhesive application means for applying an adhesive to a back surface 22 of the panel proximate the edge 16 substantially throughout the length of the panel 10 as the panel is moved past the adhesive application means, a folding bar 30 positioned downstream from the adhesive application means to transversely deflect the flap 18 downward toward the adhesive on the back surface 22 of the panel 10, and a sealing roller 32 positioned downstream from the folding bar 30 and arranged to spin inwardly over the flap to cause the flap to stretch inwardly and be secured to the back surface of the panel.

Figure 3:
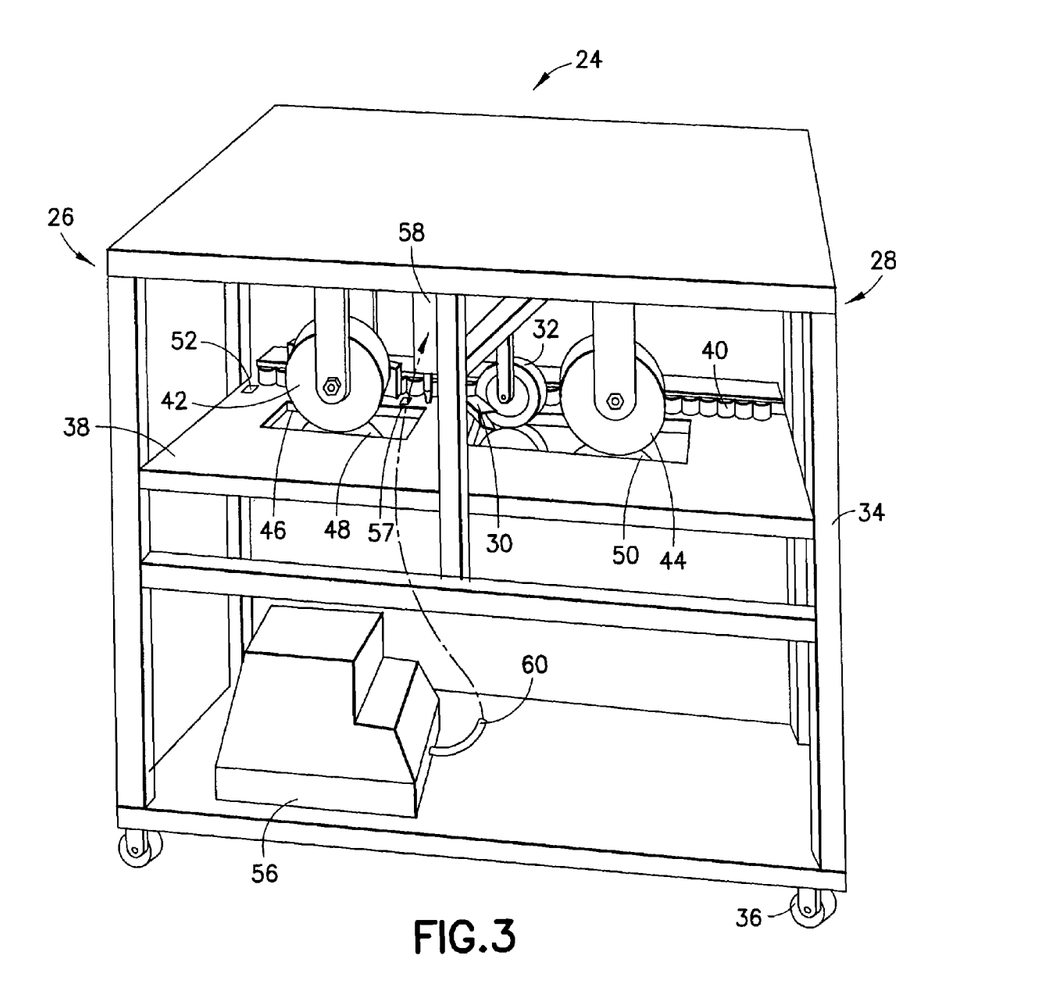
FIG. 3 is a front, top and right side perspective view of an edge wrapping apparatus.

The edge wrapping apparatus 24 is flexible in its set up for versatile uses. All of the foregoing components are mounted on a frame 34 having casters 36 to provide portability, such that the apparatus may be freely moved anywhere in a factory or otherwise. For example, the edge wrapping apparatus 24 may be placed next to any available table to provide a means for automatically stacking wrapped panels at the exit end 28 after discharge from the apparatus or stacking unwrapped panels at the entry end 26 to facilitate placement of unwrapped panels into the apparatus. The frame may be constructed from bars of any material capable of carrying the weight of the components. The bars may be arranged in positions that permit the preferred arrangement of the folding, sealing and adhesive application components of the apparatus. The frame may also include shelving for housing various components such as the adhesive application means, to permit all components to be housed on the frame, and provide a self-contained, portable edge wrapping apparatus.

The edge wrapping apparatus 24 comprises a platform 38 that extends lengthwise of the apparatus and supports the panel as it is moved through the apparatus from the entry end 26 to the exit end 28. The platform 38 comprises a material or has a coating that prevents scratching or binding of the panel 10 or laminate cover 12, such as TEFLON®. The platform is set at a height to be useful in combination with automatic or other systems at the entry and exit of the apparatus. However, the platform height may be set higher or lower to accommodate manual operation of the apparatus by a variety of users. In other embodiments, the platform and other components of the edge wrapping apparatus could be made to be adjustable to change the height after the apparatus is assembled.

In preparation for entry into the edge wrapping apparatus 24, a laminate cover 12 should be adhesively secured to a panel 10 with at least one flap 18 extending past a side edge 16 of the panel. Any type of adhesive suitable for the intended purpose and materials may be used. Preferred adhesives include contact cement, pressure sensitive adhesives or hot-melt adhesives. The flaps 18 should be trimmed to approximately ½ inch past the side edge 16 of the panel. The covered panels may then be manually inserted into the edge wrapping apparatus 24 or may be inserted via an automatic feeding system for sequentially supplying covered panels to the edge wrapping apparatus.

Figure 4:
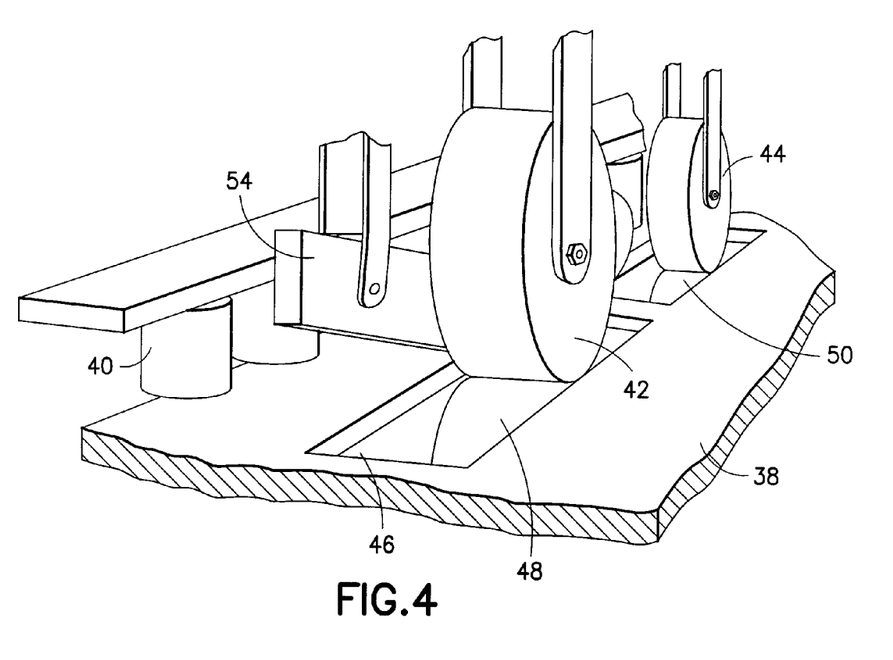
FIG. 4 is an entry side view of the edge wrapping apparatus shown in FIG. 3.
Figure 5:
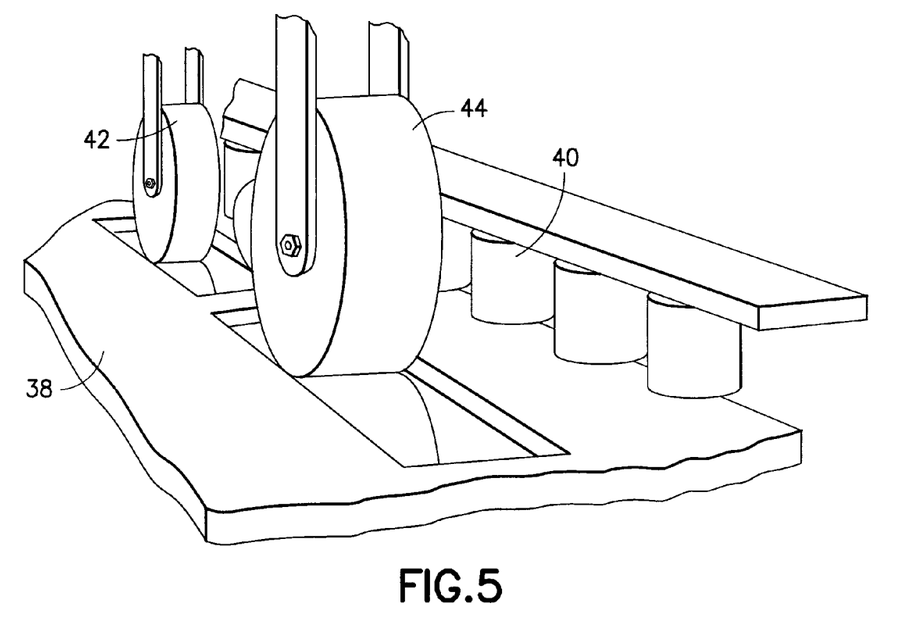
FIG. 5 is an exit side view of the edge wrapping apparatus shown in FIG. 3.

The covered panels are inserted into the entry end 26 of the edge wrapping apparatus 24 by placing a leading edge of the unwrapped panel with the laminate cover or front surface 14 facing down onto the platform 38. Referring to FIG. 4, the side edge 16 with the flap 18 is placed adjacent a series of guide rollers 40 that extend the entire length of the apparatus to provide a guide for the panel as it moves through the apparatus. Each roller in the series of guide rollers 40 is arranged to rotate about an axis positioned perpendicular to the platform, such that rolling surface of each roller is positioned to contact the side edge 16 of the panel 10.

Conveying means are provided to move the panel through the apparatus from the entry end 26 to the exit end 28, as it is guided by the platform 38 and the series of guide rollers 40. As shown in the drawings, a first drive wheel 42 is provided proximate the entry end 26 and a second drive wheel 44 is provided proximate the exit end 28. The first and second drive wheels are positioned to rotate about an axis that is parallel to the platform 38, and provide sufficient rotational force to engage and move the panel across the platform. The first and second drive wheels may be singular wheels arranged on top of the platform such that the panel 10 travels between the drive wheel and the platform. Alternatively, as shown in the drawings, each of the drive wheels may comprise top and bottom wheels arranged to form a nip that provides rotational force to both the front surface 14 and the back surface 22 of the panel. If such wheel pairs are used, then the platform should have openings 46 large enough to permit the bottom wheel in each pair 48, 50 to extend through the opening and contact the upper wheel in each pair 42, 44. Drive wheels sufficient for this purpose are preferably non-marking rubber tread wheels of the type available from Albion Inc., Albion, Mich. Stepper or other type of motors (not shown) may be used to power the drive wheels and provide variable rotational speeds of the drive wheels. It has been found that setting the drive wheels at speeds of approximately 240 inches per minute permits wrapping edges of a 60 inch panel in about 15 seconds, instead of the 15 minutes it currently takes to manually wrap the same panel. It is understood that the drive wheels and platform shown in the drawings may be replaced with a conveyor belt arranged horizontally from the entry end 26 to the exit end 28 to translate the panel 10 through the apparatus. A platform may be situated under a top portion of the conveyor belt to provide additional support for the panel as it is conveyed through the apparatus.

A first sensor 52 is provided at the entry end to sense when a panel is placed in the apparatus and is ready to be wrapped. For example, an infrared sensor may be used to detect an interruption when the panel enters the apparatus. When such interruption is detected, the stepper motors are activated, causing the drive wheels (or other conveying means) to rotate and the panel to move through the apparatus. Alternatively, a switch can be provided to turn the stepper motors on and off.

Lifting means is provided at the entry end 26 for transversely deflecting the flap 18 upward to a position substantially perpendicular to the front surface 14 of the panel as the panel 10 is conveyed through the apparatus. The lifting means may be in the form of a finger, bar or other type of ramped structure to effectuate lifting of the flap. Referring to FIG. 4, a bar 54 is provided with a downward angle from the entry end 26, such that when the flap contacts the lower end of the bar 54, the bar effects upward deflection of the flap. The flap is then supported between the bar 54 and the series of guide rollers 40 in a position substantially perpendicular to the front surface 14 of the panel to ready the flap for wrapping and adhesive securement to back surface of the panel. In a preferred embodiment, the bar is made from a material or coated with a surface coating to facilitate sliding of the flap between the bar and the series of guide rollers 40 without binding, such as TEFLON®.

Figure 6:
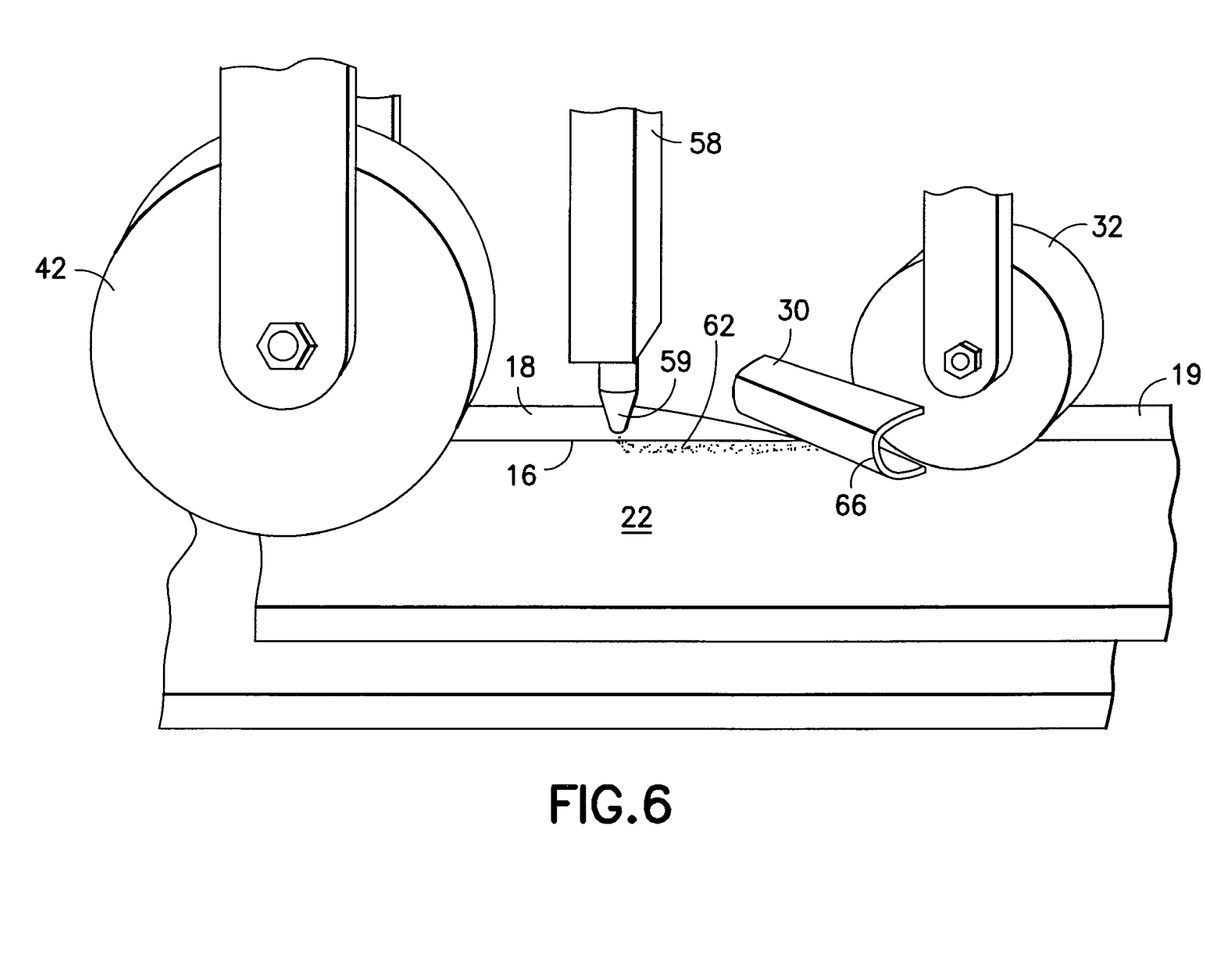
FIG. 6 is a close-up front plan view of the apparatus of FIG. 3, in process of applying adhesive to a panel, folding a flap of the laminate cover, and stretching and sealing the flap to the back cover of the panel.

Adhesive application means is provided downstream of the lifting means to apply an adhesive to a back surface 22 of the panel 10 proximate the side edge 16 substantially throughout the length of the panel as the panel is moved past the adhesive application means. Preferred adhesives are epoxy, hot-melt adhesives having a melt temperature greater than 450° F. For example, a preferred type of adhesive is LOCTITE® HYSOL 7802R available from Henkel Corp., Westlake, Ohio, having a melting temperate of about 450° F. The adhesive may be applied in liquid or spray form, with liquid applicators forming either round or flat beads. Adhesive application systems available from Hot Melt Technologies, Inc., Rochester Hills, Mich. have been found to be useful for these purposes. Such systems typically include a hot melt adhesive tank and pump system 56, a nozzle 58 and a hose 60 connecting the nozzle to the tank system. The nozzle 58 may be arranged on the edge wrapping apparatus such that the tip 59 of the nozzle is pointing down toward the back surface 22 of the panel 10 to apply a continuous adhesive bead 62 to the back surface 22, as shown in FIG. 6. The first sensor 52 or the main power switch for the edge wrapping apparatus may activate the adhesive application system. Alternatively, a second sensor 57 may be provided downstream from the front drive wheel 42 to sense the panel 10 and activate the adhesive application system as the panel 10 is conveyed past the nozzle 58. Both the first and second sensors may be placed in the platform 38 or on the side of the platform.

Figure 7:
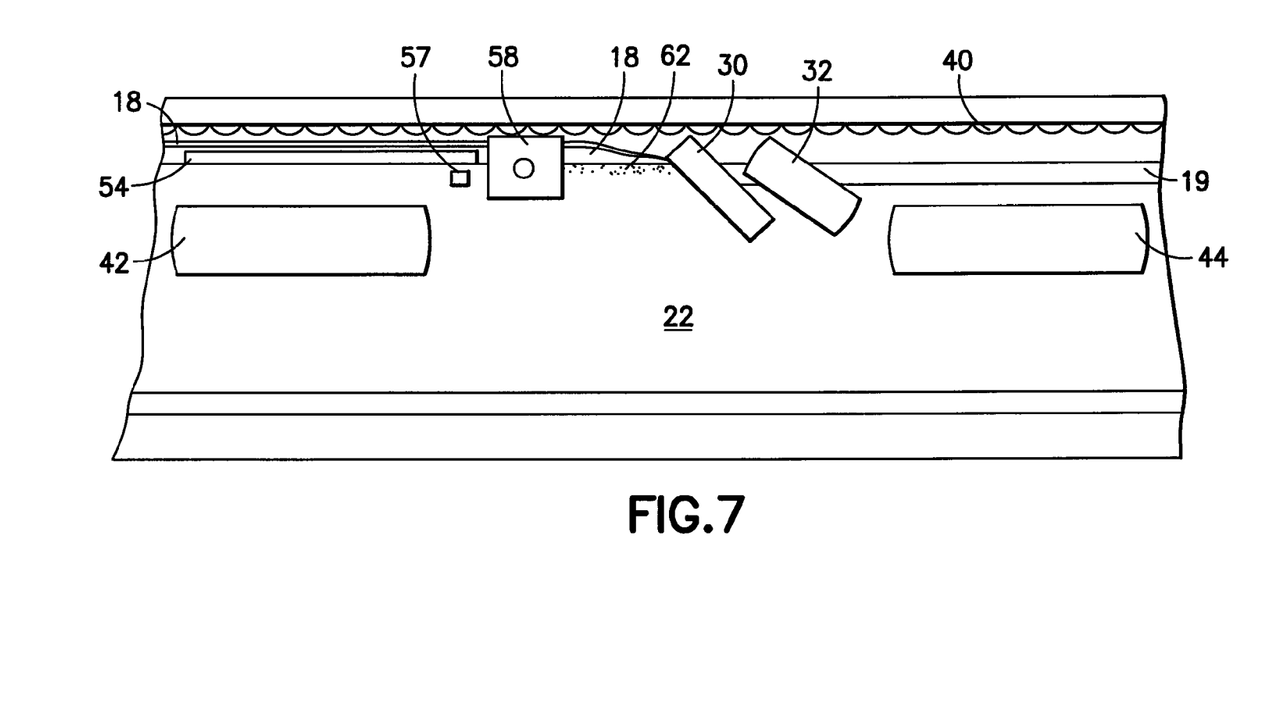
FIG. 7 is a top view of the apparatus shown in FIG. 6.

A folding bar 30 is positioned downstream from the adhesive applicator 58 to extend from beyond the side edge 16 in toward the center of the panel to transversely deflect the flap 18 down toward the adhesive 62 on the back surface 22 of the panel 10 as the panel is conveyed from the entry end 26 to the exit end 28 of the apparatus. In FIG. 6, the panel 10 is moved from left to right and the folding bar 30 deflects the flap 18 down. The folding bar is positioned at an obtuse angle, preferably 135 to 170 degrees, relative to the side edge 16 with the flap 18 prior to folding as shown in FIG. 7. The length of the folding bar should be selected to extend at least past the flap 18 when in a folded position (for example, as shown on the right side of the folding bar 30 in FIG. 7), at least ½ inch in from the side edge 16. The folding bar 30 comprises a radiused rear side 66, preferably with a ½ to ¾ inch radius, to facilitate folding of the flap 18 toward the back surface 22 of the panel 10, and can be made from any rigid material such as aluminum or other metals.

After the flap 18 is folded down against the back surface 22 of the panel 10, the folded flap 19 is preferably stretched inward under pressure to provide a smooth seal to the panel. For this purpose, a tension roller 32 is positioned downstream from the folding bar 30 and arranged to spin while in contact with the folded flap 19. The roller spins inwardly (counterclockwise as shown in FIG. 6) over the folded flap 19 at an obtuse angle, preferably 130 to 150 degrees, and most preferably about 135 degrees, relative to the side edge 16 with the flap 18 prior to folding as shown in FIG. 7. The tension roller 32, similar to the drive wheels 42, 44, may be a single roller above the platform 38, or may be arranged as a top and bottom pair of rollers. When a pair of rollers is used, the bottom tension roller 70 is arranged to spin about an axis substantially perpendicular to the side edge 16 and the top tension roller is arranged to spin inwardly at the obtuse angle described above. A spring is provided to cause the rollers to bias toward each other and provide pressure of about 10 pounds to the folded flap 19 as it passes through the nip of the tension rollers. This arrangement pulls, stretches and squeezes the folded flap 19 to prevent wrinkles or voids in the sealed flap and the laminate cover 12 on the front surface 14 of the panel 10. Use of a pair of tension rollers with a straight roller on bottom and an angled roller on top as described above facilitates the pulling and stretching effect. Tension rollers sufficient for these purposes are non-marking rubber tread wheels of the type available, for example, from Albion Inc., Albion, Mich. or Bosch Rexroth AG, Germany. The tension roller 32 is tensioned by gravity, and no power is needed to cause the tension roller 32 to spin. Movement of the panel 10 through the apparatus 24 causes the tension roller 32 to spin. However, a stepper motor may be provided for powering the tension roller 32, which may be activated when the main power switch is turned on, or when either the first or second sensors 52, 57 sense a panel 10 in the edge wrapping apparatus 24.

As the flap 18 is been adhesively secured to the back surface 22 of the panel 10, the second drive wheel 44 provides sufficient force to discharge the panel from the exit end 28 (shown in FIG. 5) of the edge wrapping apparatus.

As described above, the edge wrapping apparatus can be situated next to an appropriate bin or table that collects the panels as they are discharged for subsequent processing or handling if desired. For example, a second edge wrapping apparatus may be positioned adjacent a first edge wrapping apparatus to receive panel with one wrapped edge from the first edge wrapping apparatus, and having the components arranged such that a flap on a second edge of the panel may be folded, wrapped and sealed to the back surface of the panel.

While the invention has been described with reference to various embodiments, it will be understood by those skilled in the art that various changes may be made and equivalents may be substituted for elements thereof without departing from the scope of the invention. For example, the edge wrapping apparatus may be modified to permit wrapping of edges that are not straight by providing the series of guide rollers 40 with a curve, and could be modified to provide a complimentary and additional set of components on the opposite side of the apparatus to permit simultaneous wrapping, folding and sealing of a second flap. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

I claim:

1. An apparatus for wrapping an edge of a panel with a laminate cover positioned on a front surface of the panel such that the laminate cover has a flap extending past the edge of the panel, the apparatus comprising:
   conveying means for moving the panel from an entry end of the apparatus to an exit end of the apparatus;
   lifting means for transversely deflecting the flap upward to a position substantially perpendicular to the front surface of the panel as the panel is conveyed;
   adhesive application means for applying an adhesive to a back surface of the panel proximate the edge substantially throughout the length of the panel as the panel is moved past the adhesive application means;
   a folding bar positioned downstream from the adhesive application means to transversely deflect the flap downward toward the adhesive on the back surface of the panel, the folding bar being positioned at an obtuse angle relative to a trailing part of the edge; and
   a roller positioned downstream from the folding bar and arranged to spin inwardly over the flap at an obtuse angle relative to the trailing part of the edge to cause the flap to stretch inwardly and be secured to the back surface of the panel.

2. The apparatus of claim 1, wherein the folding bar is positioned at an angle of about 135 to 170 degrees relative to the trailing part of the edge.

3. The apparatus of claim 1, wherein the roller comprises a bottom roller arranged to spin in a direction parallel to the direction of movement of the panel and a top roller positioned to spin at an angle of about 130 to 150 degrees relative to the trailing part of the edge.

4. The apparatus of claim 1, wherein the adhesive is a hot-melt adhesive having a melt temperature of greater than 450° F.

5. The apparatus of claim 4, wherein the adhesive application means applies the adhesive in the form selected from the group consisting of an adhesive bead, a flat bead and an adhesive spray.

6. The apparatus of claim 1, wherein the folding bar comprises a radiused back end to gradually deflect the flap downward.

7. The apparatus of claim 1, further comprising a platform for supporting the panel in the apparatus.

8. The apparatus of claim 1, further comprising a frame supporting the conveying means, the lifting means, the adhesive application means, the folding bar and the roller, the frame being supported on casters to provide flexibility and portability.

9. The apparatus of claim 1, further comprising a series of guide rollers extending a length of the apparatus to guide the panel while the panel is being conveyed, each roller in the series of guide rollers supported for rotation about an axis which is substantially perpendicular to the direction of movement of the panel.

10. An apparatus for wrapping an edge of a panel with a laminate cover positioned on a front surface of the panel such that the laminate cover has a flap extending past the edge of the panel, the apparatus comprising:
   conveying means for moving the panel from an entry end of the apparatus to an exit end of the apparatus;
   lifting means for transversely deflecting the flap upward to a position substantially perpendicular to the front surface of the panel as the panel is conveyed;
   adhesive application means for applying an adhesive to a back surface of the panel proximate the edge substantially throughout the length of the panel as the panel is moved past the adhesive application means;
   a folding bar positioned downstream from the adhesive application means at an angle of about 135 to 170 degrees relative to a trailing part of the edge to transversely deflect the flap downward toward the adhesive on the back surface of the panel; and
   a tension roller comprising a bottom roller arranged to spin in a direction parallel to the direction of movement of the panel and a top roller positioned to spin over the flap at an angle of about 130 to 150 degrees relative to the trailing part of the edge to cause the flap to stretch inwardly and be secured to the back surface of the panel, the tension roller being positioned downstream from the folding bar.

11. The apparatus of claim 10, further comprising a frame supporting the conveying means, the lifting means, the adhesive application means, the folding bar and the roller, the frame being supported on casters to provide flexibility and portability.

12. The apparatus of claim 11, wherein the folding bar comprises a radiused back end to gradually deflect the flap downward.

13. The apparatus of claim 12, further comprising a series of guide rollers extending a length of the apparatus to guide the panel while the panel is being conveyed, each roller in the series of guide rollers supported for rotation about an axis which is substantially perpendicular to the direction of movement of the panel.

14. A method for wrapping an edge of a panel with a laminate cover positioned on a front surface of the panel such that the laminate cover has a flap extending past the edge of the panel, the method comprising the steps of:
   positioning the panel at an entry end of an edge wrapping apparatus having a conveying system for effecting generally linear movement of the panel lengthwise through the edge wrapping apparatus;

transversely deflecting the flap upward to a position substantially perpendicular to the front surface of the panel as the panel is moved through the edge wrapping apparatus;

applying an adhesive to a back surface of the panel proximate the edge substantially throughout the length of the panel as the panel is moved through the edge wrapping apparatus;

moving the panel past a folding bar positioned at an obtuse angle relative to a trailing part of the edge to transversely deflect the flap downward toward the adhesive on the back surface of the panel; and moving the panel through a roller positioned arranged to spin inwardly over the flap at an obtuse angle relative to the trailing part of the edge to cause the flap to stretch inwardly and be secured to the back surface of the panel.

15. The method of claim 14, wherein the folding bar is positioned at an angle of about 135 to 170 degrees relative to the trailing part of the edge.

16. The method of claim 14, wherein the roller is arranged with a bottom roller arranged to spin in a direction parallel to the direction of movement of the panel and a top roller positioned to spin at an angle of about 130 to 150 degrees relative to trailing part of the edge.

17. The method of claim 14, wherein the adhesive is a hot-melt adhesive having a melt temperature of greater than 450° F.

18. The method of claim 14, wherein the adhesive is applied in the form selected from the group consisting of an adhesive bead, a flat bead and an adhesive spray.

19. The method of claim 14, further comprising guiding the panel through the edge wrapping apparatus with a series of guide rollers extending a length of the apparatus, each roller in the series of guide rollers being supported for rotation about an axis which is substantially perpendicular to the direction of movement of the panel.

20. The method of claim 14, wherein the folding bar is positioned at an angle of about 135 to 170 degrees relative to the trailing part of the edge, and the roller is arranged to spin at an angle of about 130 to 150 degrees relative to trailing part of the edge.

* * * * *